(12) United States Patent
Venkatraman et al.

(10) Patent No.: US 11,984,749 B2
(45) Date of Patent: *May 14, 2024

(54) BATTERY CHARGING CONTROL FOR ELECTRONIC DEVICES

(71) Applicant: Apple Inc., Cupertino, CA (US)

(72) Inventors: Kartik R. Venkatraman, Santa Clara, CA (US); Mary-Ann Rau, San Francisco, CA (US); Felix T. Tristram, Santa Clara, CA (US); Andres Y. Chabolla, La Habra, CA (US); Antonio De Lima Fernandes, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 17/354,946

(22) Filed: Jun. 22, 2021

(65) Prior Publication Data

US 2021/0391739 A1    Dec. 16, 2021

Related U.S. Application Data

(63) Continuation-in-part of application No. 16/902,805, filed on Jun. 16, 2020, now Pat. No. 11,089,398.

(51) Int. Cl.
*H02J 7/00* (2006.01)
*H04R 1/10* (2006.01)
*H04W 52/02* (2009.01)

(52) U.S. Cl.
CPC .......... *H02J 7/0071* (2020.01); *H02J 7/0044* (2013.01); *H02J 7/00712* (2020.01);
(Continued)

(58) Field of Classification Search
CPC ............... H04R 1/1025; H04R 1/1041; H04R 2420/07; H04R 1/1016; H02J 2310/22;
(Continued)

(56) References Cited

U.S. PATENT DOCUMENTS 5,606,242 A * 2/1997 Hull .................... H02J 7/00036
429/432
9,967,644 B2 * 5/2018 Chawan ............... H04R 1/1058
(Continued)

FOREIGN PATENT DOCUMENTS

KR    10-2010-0077141 A    7/2010
KR    10-2014-0132616 A    11/2014
WO       2018222374 A1    12/2018

*Primary Examiner* — Lun-See Lao
(74) *Attorney, Agent, or Firm* — Young Basile Hanlon & MacFarlane, P.C.

(57) ABSTRACT

A method of controlling charging of an electronic device includes estimating a usage time value that corresponds to an anticipated future occurrence of usage of the electronic device; and estimating a resume time value that corresponds to a time for charging to commence to allow for completion of charging from a first predetermined state of charge value to a second predetermined state of charge value by the usage time value. The method also includes charging a battery of the electronic device using electrical power supplied by a charging device until a current state of charge of the battery reaches the first predetermined state of charge value, entering, by the electronic device, a deactivated mode after the current state of charge reaches the first predetermined state of charge value, and causing the electronic device to return to the activated mode according to the resume time value.

24 Claims, 10 Drawing Sheets

(52) U.S. Cl.
CPC ......... *H04R 1/1016* (2013.01); *H04R 1/1025* (2013.01); *H04R 1/1041* (2013.01); *H04W 52/0229* (2013.01); *H04R 2420/07* (2013.01)

(58) Field of Classification Search
CPC .... H02J 7/0044; H02J 7/0071; H02J 7/00712; H02J 7/007188; H04W 52/0229; Y02D 30/70
USPC .......................... 381/74, 312, 56–58; 700/94
See application file for complete search history.

(56) References Cited

U.S. PATENT DOCUMENTS

| | | |
|---|---|---|
| 10,009,678 B2 | 6/2018 | Panecki et al. |
| 10,083,105 B2 | 9/2018 | de la Cropte de Chanterac et al. |
| 10,097,913 B2 | 10/2018 | Zorkendorfer et al. |
| 10,148,546 B2 | 12/2018 | Venkatraman et al. |
| 10,234,926 B2 | 3/2019 | Gatson et al. |
| 10,263,421 B2 | 4/2019 | Huang et al. |
| 10,390,594 B2 | 8/2019 | Brzezinski et al. |
| 10,606,336 B2 | 3/2020 | de la Cropte de Chanterac et al. |
| 10,893,351 B1 | 1/2021 | Geng et al. |
| 11,089,398 B1* | 8/2021 | Venkatraman ....... H04R 1/1041 |
| 2008/0180874 A1 | 7/2008 | Gauger et al. |
| 2013/0086409 A1* | 4/2013 | Lu .......................... H04L 12/66 713/340 |
| 2013/0223640 A1 | 8/2013 | Urano et al. |
| 2014/0082383 A1 | 3/2014 | De Cesare et al. |
| 2017/0013369 A1 | 1/2017 | Renken et al. |
| 2017/0104352 A1 | 4/2017 | Stratton et al. |
| 2017/0373522 A1 | 12/2017 | Pelosi et al. |
| 2018/0212455 A1 | 7/2018 | Kasar et al. |
| 2018/0348844 A1 | 12/2018 | Lingutla et al. |
| 2018/0351390 A1 | 12/2018 | Venkatraman et al. |
| 2018/0364786 A1 | 12/2018 | de la Cropte de Chanterac et al. |
| 2018/0367881 A1 | 12/2018 | Zupke et al. |
| 2019/0033385 A1 | 1/2019 | Karner et al. |
| 2019/0069245 A1 | 2/2019 | Miller et al. |
| 2019/0081499 A1 | 3/2019 | Sun et al. |
| 2019/0250689 A1 | 8/2019 | Ivanov et al. |
| 2019/0305597 A1 | 10/2019 | Venkatraman et al. |
| 2020/0379542 A1* | 12/2020 | Lin ....................... G06F 1/1698 |

\* cited by examiner

BATTERY CHARGING CONTROL FOR ELECTRONIC DEVICES

CROSS-REFERENCE TO RELATED APPLICATIONS

This application is a continuation in part of U.S. patent application Ser. No. 16/902,805, filed on Jun. 16, 2020, the content of which is incorporated herein by reference in its entirety for all purposes.

TECHNICAL FIELD

This disclosure relates to charging rechargeable batteries.

BACKGROUND

Electronic devices can be powered by rechargeable batteries. The batteries can be recharged by supply of electrical power to the rechargeable batteries using a charging device.

SUMMARY

One aspect of the disclosure is a method of controlling charging of an electronic device. The method includes estimating a usage time value that corresponds to an anticipated future occurrence of usage of the electronic device, and estimating a resume time value that corresponds to a time for charging to commence to allow for completion of charging from a first predetermined state of charge value to a second predetermined state of charge value by the usage time value. The method also includes charging a battery of the electronic device using electrical power supplied by a charging device until a current state of charge of the battery reaches the first predetermined state of charge value. The method also includes entering, by the electronic device, a deactivated mode after the current state of charge reaches the first predetermined state of charge value, and causing the electronic device to return to an activated mode according to the resume time value.

In some implementations of the method, causing the electronic device to return to the activated mode according to the resume time value includes transmitting a wake signal from the charging device to the electronic device after a current time value reaches the resume time value, wherein the electronic device is configured to enter the activated mode in response to receiving the wake signal. Some implementations of the method include, subsequent to returning to the activated mode, charging the battery of the electronic device using electrical power supplied by the charging device until the current state of charge of the battery reaches the second predetermined state of charge value.

In some implementations of the method, the charging device is a charging case and the electronic device is located in the charging case when the electronic device is electrically connected to the charging device.

In some implementations of the method, estimating the usage time value is performed based on charging history information for the electronic device. In some implementations of the method, estimating the usage time value is performed based on connection history information regarding wireless communications between the electronic device and a host device. In some implementations of the method, estimating the usage time value is performed by a controller of the electronic device. In some implementations of the method, estimating the usage time value is performed by a controller of the charging device.

Another aspect of the disclosure is a non-transitory computer-readable storage device including program instructions executable by one or more processors that, when executed, cause the one or more processors to perform operations for controlling charging of an electronic device. The operations include estimating a usage time value that corresponds to an anticipated future occurrence of usage of the electronic device, and estimating a resume time value that corresponds to a time for charging to commence to allow for completion of charging from a first predetermined state of charge value to a second predetermined state of charge value by the usage time value. The operations also include charging a battery of the electronic device using electrical power supplied by a charging device until a current state of charge of the battery reaches the first predetermined state of charge value, and entering, by the electronic device, a deactivated mode after the current state of charge reaches the first predetermined state of charge value. The operations also include causing the electronic device to return to an activated mode according to the resume time value.

In some implementations of the non-transitory computer-readable storage device, causing the electronic device to return to the activated mode according to the resume time value includes transmitting a wake signal from the charging device to the electronic device after a current time value reaches the resume time value, wherein the electronic device is configured to enter the activated mode in response to receiving the wake signal. Some implementations of the non-transitory computer-readable storage device include, subsequent to returning to the activated mode, charging the battery of the electronic device using electrical power supplied by the charging device until the current state of charge of the battery reaches the second predetermined state of charge value.

In some implementations of the non-transitory computer-readable storage device, the charging device is a charging case and the electronic device is located in the charging case when the electronic device is electrically connected to the charging device.

In some implementations of the non-transitory computer-readable storage device, estimating the usage time value is performed based on charging history information for the electronic device. In some implementations of the non-transitory computer-readable storage device, wherein estimating the usage time value is performed based on connection history information regarding wireless communications between the electronic device and a host device. In some implementations of the non-transitory computer-readable storage device, estimating the usage time value is performed by a controller of the electronic device. In some implementations of the non-transitory computer-readable storage device, estimating the usage time value is performed by a controller of the charging device.

Another aspect of the disclosure is a system for controlling charging of an electronic device. The system includes one or more processors that are provided with computer program instructions that, when executed by the one or more processors, cause the one or more processors to estimate a usage time value that corresponds to an anticipated future occurrence of usage of the electronic device, and estimate a resume time value that corresponds to a time for charging to commence to allow for completion of charging from a first predetermined state of charge value to a second predetermined state of charge value by the usage time value. The instructions further cause the one or more processors to charge a battery of the electronic device using electrical power supplied by a charging device until a current state of charge of the battery reaches the first predetermined state of charge value, enter, by the electronic device, a deactivated mode after the current state of charge reaches the first predetermined state of charge value, and cause the electronic device to return to an activated mode according to the resume time value.

In some implementations of the system, the computer program instructions to cause the electronic device to return to the activated mode according to the resume time value include instructions to transmit a wake signal from the charging device to the electronic device after a current time value reaches the resume time value, wherein the electronic device is configured to enter the activated mode in response to receiving the wake signal. In some implementations of the system, the instructions further cause the one or more processors to, subsequent to returning to the activated mode, charge the battery of the electronic device using electrical power supplied by the charging device until the current state of charge of the battery reaches the second predetermined state of charge value.

In some implementations of the system, the charging device is a charging case and the electronic device is located in the charging case when the electronic device is electrically connected to the charging device.

In some implementations of the system, the usage time value is estimated based on charging history information for the electronic device. In some implementations of the system, estimating the usage time value is estimated based on connection history information regarding wireless communications between the electronic device and a host device. In some implementations of the system, the usage time value is estimated by a controller of the electronic device. In some implementations of the system, the usage time value is estimated by a controller of the charging device.

Another aspect of the disclosure is a method of controlling charging of a wireless headphone device. The method includes estimating a usage time value that corresponds to an anticipated future occurrence of usage of a wireless headphone device for audio output, and estimating a resume time value that corresponds to a time for charging to commence to allow for completion of charging from a first predetermined state of charge value to a second predetermined state of charge value by the usage time value. The method also includes determining that the wireless headphone device has been placed in a charging case. The method also includes charging a battery of the wireless headphone device using electrical power supplied by the charging case until a current state of charge of the battery reaches the first predetermined state of charge value, entering, by the wireless headphone device, a deactivated mode after the current state of charge reaches the first predetermined state of charge value. The charging case is configured to return the wireless headphone device to an activated mode according to the resume time value.

In some implementations of the method, the method also includes entering, by the wireless headphone device, an activated mode in response to a wake signal from the charging case to the wireless headphone device after a current time value reaches the resume time value, and charging the battery of the wireless headphone device using electrical power supplied by the charging case until the current state of charge of the battery reaches the second predetermined state of charge value.

In some implementations of the method, estimating the usage time value is performed by a host device based in part on connection history information regarding wireless communications between the wireless headphone device and the host device.

In some implementations of the method, estimating the usage time value is performed using a machine-learning based model that receives the connection history information as an input.

In some implementations of the method, the usage time value is transmitted from the host device to a controller of the wireless headphone device, the resume time value is determined by the controller of the wireless headphone device, and the resume time value is transmitted from the wireless headphone device to the charging case.

In some implementations of the method, no electrical power from the battery of the wireless headphone device is used by the wireless headphone device in the deactivated mode.

In some implementations of the method, the first predetermined state of charge value is between seventy percent and ninety percent of a fully-charged state of charge value of the battery of the wireless headphone device, and the second predetermined state of charge value is at least ninety-five percent of a fully charged state of charge value of the battery of the wireless headphone device.

The method may also include outputting a notification at a host device in response to detecting an attempt to use the wireless headphone device before the current state of charge of the battery reaches the second predetermined state of charge value.

The method may also include disabling entry into the deactivated mode if the battery of the wireless headphone device is fully discharged prior to charging the battery of the wireless headphone device using electrical power supplied by the charging case until the current state of charge of the battery reaches the first predetermined state of charge value.

Another aspect of the disclosure is a non-transitory computer-readable storage device including program instructions executable by one or more processors that, when executed, cause the one or more processors to perform operations. The operations include estimating a usage time value that corresponds to an anticipated future occurrence of usage of a wireless headphone device for audio output, and estimating a resume time value that corresponds to a time for charging to commence to allow for completion of charging from a first predetermined state of charge value to a second predetermined state of charge value by the usage time value. The operations also include determining that the wireless headphone device has been placed in a charging case. The operations also include charging a battery of the wireless headphone device using electrical power supplied by the charging case until a current state of charge of the battery reaches the first predetermined state of charge value, and entering, by the wireless headphone device, a deactivated mode after the current state of charge reaches the first predetermined state of charge value. The charging case is configured to return the wireless headphone device to an activated mode according to the resume time value.

In some implementations of the non-transitory computer-readable storage device, the operations also include entering, by the wireless headphone device, an activated mode in response to a wake signal from the charging case to the wireless headphone device after a current time value reaches the resume time value, and charging the battery of the wireless headphone device using electrical power supplied by the charging case until the current state of charge of the battery reaches the second predetermined state of charge value.

In some implementations of the non-transitory computer-readable storage device, estimating the usage time value is performed by a host device based in part on connection history information regarding wireless communications between the wireless headphone device and the host device.

In some implementations of the non-transitory computer-readable storage device, estimating the usage time value is performed using a machine-learning based model that receives the connection history information as an input.

In some implementations of the non-transitory computer-readable storage device, the usage time value is transmitted from the host device to a controller of the wireless headphone device, the resume time value is determined by the controller of the wireless headphone device, and the resume time value is transmitted from the wireless headphone device to the charging case.

In some implementations of the non-transitory computer-readable storage device, no electrical power from the battery of the wireless headphone device is used by the wireless headphone device in the deactivated mode.

In some implementations of the non-transitory computer-readable storage device, the first predetermined state of charge value is between seventy percent and ninety percent of a fully-charged state of charge value of the battery of the wireless headphone device, and the second predetermined state of charge value is at least ninety-five percent of a fully charged state of charge value of the battery of the wireless headphone device.

In some implementations of the non-transitory computer-readable storage device, the operations further include outputting a notification at a host device in response to detecting an attempt to use the wireless headphone device before the current state of charge of the battery reaches the second predetermined state of charge value.

In some implementations of the non-transitory computer-readable storage device, the operations further include disabling entry into the deactivated mode if the battery of the wireless headphone device is fully discharged prior to charging the battery of the wireless headphone device using electrical power supplied by the charging case until the current state of charge of the battery reaches the first predetermined state of charge value.

Another aspect of the disclosure is a charging system. The charging system includes a host device, a wireless headphone device that includes a battery, and a charging case. The host device is configured to estimate a usage time value that corresponds to an anticipated future occurrence of usage of the wireless headphone device for audio output in response to placement of the wireless headphone device in the charging case. The battery of the wireless headphone device is charged by electrical power supplied by the charging case until a current state of charge of the battery reaches a first predetermined state of charge value. The wireless headphone device enters a deactivated mode after the current state of charge reaches the first predetermined state of charge value. The charging case is configured to return the wireless headphone device to an activated mode according to a resume time value. The resume time value is an estimated time for charging to commence to allow for completion of charging from the first predetermined state of charge value to a second predetermined state of charge value by the usage time value.

In some implementations of the charging system, the wireless headphone device enters an activated mode after a current time value reaches a resume time value. The battery of the wireless headphone device is charged using electrical power supplied by the charging case until the current state of charge of the battery reaches the second predetermined state of charge value.

In some implementations of the charging system, the usage time value is estimated by the host device based in part on connection history information regarding wireless communications between the wireless headphone device and the host device.

In some implementations of the charging system, the usage time value is estimated using a machine-learning based model that receives the connection history information as an input.

In some implementations of the charging system, the usage time value is transmitted from the host device to a controller of the wireless headphone device, the resume time value is determined by the controller of the wireless headphone device, and the resume time value is transmitted from the wireless headphone device to the charging case.

In some implementations of the charging system, no electrical power from the battery of the wireless headphone device is used by the wireless headphone device in the deactivated mode.

In some implementations of the charging system, the first predetermined state of charge value is between seventy percent and ninety percent of a fully-charged state of charge value of the battery of the wireless headphone device, and the second predetermined state of charge value is at least ninety-five percent of a fully charged state of charge value of the battery of the wireless headphone device.

In some implementations of the charging system, a notification is output at a host device in response to detecting an attempt to use the wireless headphone device before the current state of charge of the battery reaches the second predetermined state of charge value.

In some implementations of the charging system, entry into the deactivated mode is disabled if the battery of the wireless headphone device is fully discharged before the battery of the wireless headphone device is charged by the electrical power supplied by the charging case until the current state of charge of the battery reaches the first predetermined state of charge value.

DETAILED DESCRIPTION

Some systems and methods that are described herein relate to charging a battery of a wireless headphone device. Some systems and methods that are described herein relate to charging a battery of an electronic device. The battery is initially charged to a first predetermined state of charge value (e.g., eighty percent state of charge). Charging is later resumed to charge to a second state of charge value (e.g., one-hundred percent). By holding the battery at the first predetermined charge value, holding the battery at a high state of charge value for a prolonged time period is avoided in order to prolong the useful life and performance of the battery. Charing is resumed according to an estimated time at which the user will next use the wireless headphone device or the electronic device.

Figure 1:
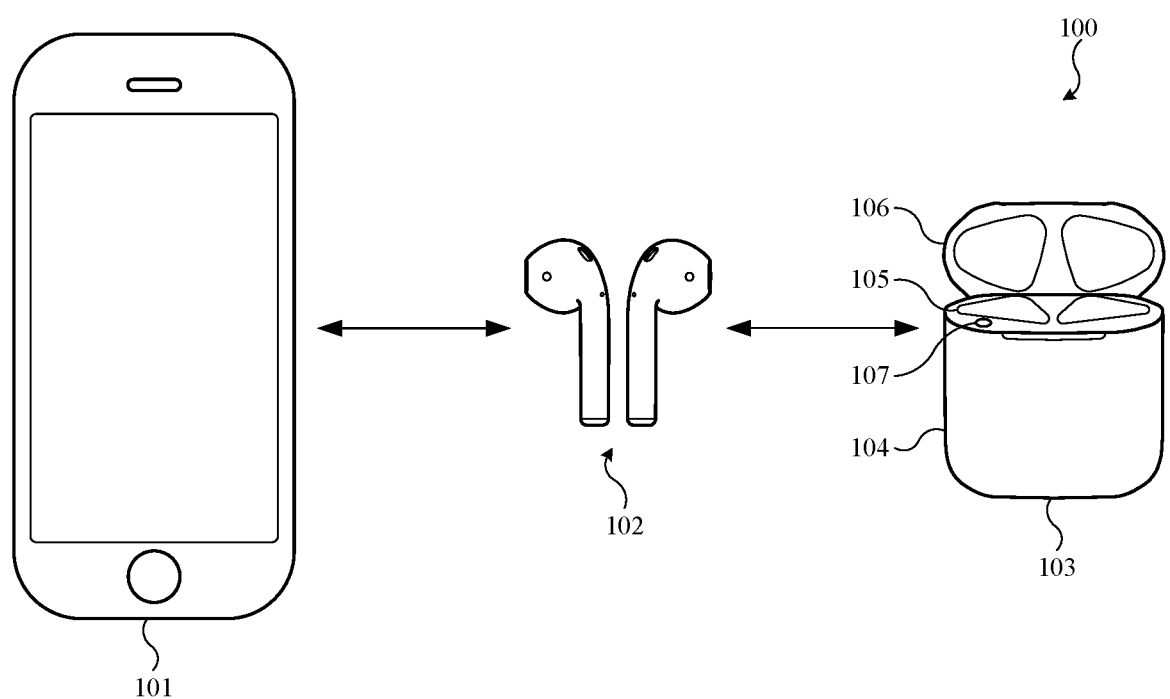
FIG. 1 is an illustration that shows an example of a charging system.

FIG. 1 is an illustration that shows an example of a charging system 100 that is configured to control charging of a rechargeable battery. The charging system 100 includes a host device 101, wireless headphone device 102, and a charging case 103.

The host device 101 is an electronic device that is able to communicate wirelessly with the wireless headphone device 102. The host device 101 may be, as examples, a desktop computer, a laptop computer, a tablet computer, or a smart phone.

The wireless headphone device 102 is an audio output device. In the illustrated example, the wireless headphone device 102, is a pair of wireless earbuds (e.g., a first wireless earbud and a second wireless earbud). In other implementations, the wireless headphone device may be a pair of on-ear headphones, a pair of over-the-ear headphones, a single wireless earbud, a wireless earpiece, or a hearing aid. In the illustrated example, the two individual wireless earbuds may communicate wirelessly with each other. In other structural configuration (e.g., as a pair of headphones), a wired connection between two earpieces may be used. In implementations with two separate devices that are part of a pair, each device (e.g., each earbud) may communicate separately with other devices, such as the host device 101 and the charging case 103, or the devices (e.g., earbuds) may be related to each other in a master-slave configuration in which only one of them communicates with other devices such as the host device 101 and the charging case 103.

The charging case 103 is a device that is configured to charge the battery or batteries of the wireless headphone device 102. The charging case 103 includes a housing 104 a receptacle 105 (e.g., a single receptacle or two receptacles) formed in the housing 104, a lid 106 that allows access to the receptacle 105 in an open position and blocks access to the receptacle 105 in a closed position and is movable between the open position and the closed position (e.g., by a hinge that connects the lid 106 to the housing 104), and a lid position sensor 107, such as a mechanical switch or a non-mechanical sensor (e.g., hall effect sensor or reed switch).

The host device 101 may communicate with the wireless headphone device 102 using a first wireless communication connection. The first wireless communication connection between the host device 101 and the wireless headphone device 102 may be connected and disconnected, for example, by establishing wireless communications to enter a connected state from a disconnected state, and by terminating wireless communications to enter the disconnected state from the connected state. The first wireless communication connection allows the host device 101 to use the wireless headphone device 102 as an audio output device, for example, by transmitting an audio signal (e.g., in the form of an encoded data stream) from the host device 101 to the wireless headphone device 102, where the audio signal is used to generate sound (e.g., using a loudspeaker).

The charging case 103 may communicate with the wireless headphone device 102 using a second wireless communication connection. The second wireless communication connection between the charging case 103 and the wireless headphone device 102 may be connected and disconnected, for example, by establishing wireless communications to enter a connected state from a disconnected state, and by terminating wireless communications to enter the disconnected state from the connected state. The second wireless communication connection allows the charging case 103 to use the wireless headphone device 102 as an audio output device, for example, by transmitting an audio signal (e.g., in the form of an encoded data stream) from the charging case 103 to the wireless headphone device 102, where the audio signal is used to generate sound (e.g., using a loudspeaker). The charging case 103 may communicate to with the host device 101 through the wireless headphone device 102 or directly through a separate wireless communication connection.

The first wireless communication connection and the second wireless communication connection may use any suitable wireless communication protocol. Communications may be direct (e.g., from device to device without intervening networking devices) or may be indirect through a wireless network. As examples, the first wireless communication connection and the second wireless communication connection may use short range, lower power radio communication protocols, such as Bluetooth®, low power Bluetooth®, or Zigbee.

Figure 2:
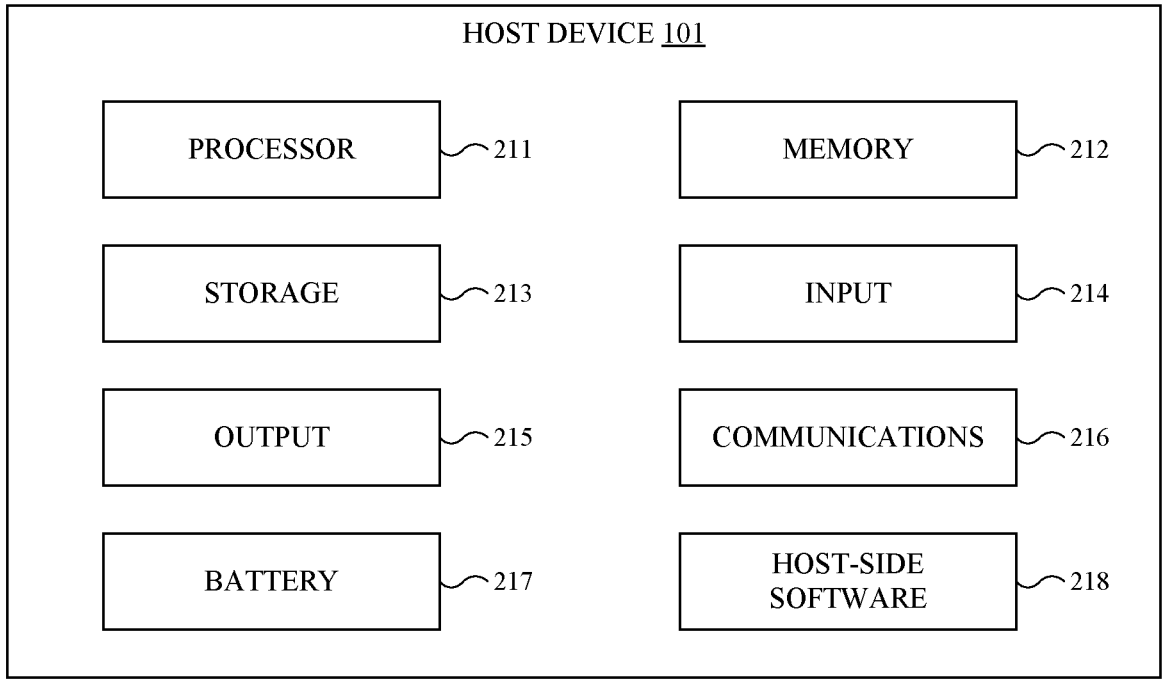
FIG. 2 is a block diagram that shows an example of a hardware configuration for a host device.

FIG. 2 is an illustration that shows an example of a hardware configuration for the host device 101. In the illustrated example, the host device 101 includes a processor 211, a memory 212, a storage device 213, one or more input devices 214, one or more output devices 215, a communications device 216, a battery 217, and host-side software 218. Hardware components of the host device 101 may be interconnected using conventional components such as a system bits.

The processor 211 is operable to execute computer program instructions and perform operations described by the computer program instructions. As an example, the processor 211 may be a conventional device such as a central processing unit. The memory 212 may be a volatile, high-speed, short-term information storage device such as a random-access memory module. The storage device 213 may be a non-volatile information storage device such as a hard drive or a solid-state drive. The input devices 214 may include any type of human-machine interface such as buttons, switches, a keyboard, a mouse, a touchscreen input device, a gestural input device, an audio input device such as a microphone that is configured to output an audio signal that can be stored as an audio recording, and an image input device such as a still image camera that is able to define a raster image (e.g., comprised of pixels) that represents a scene or a video camera that is operable to define raster video frames that represent a scene. The output devices 215 may include any type of device operable to provide an indication to a user regarding an operating state, such as a display screen or an audio output.

The communications device 216 is a short range wireless communications device. As an example, the communications device 216 may transmit information using radio frequencies. The communications device 216 may use conventional short range communications protocols or wireless networking protocols. The communications device 216 may use short range, lower power radio communication protocols, such as Bluetooth®, low power Bluetooth®, or Zigbee. The communications device 216 may be used by the host device 101 to establish the first wireless communications connection with the wireless headphone device 102.

The battery 217 is a power source (e.g., including battery cells) that is included in the host device 101. The battery 217 is configured to supply electrical power to the various components of the host device 101. The battery 217 is a rechargeable having a state of charge that decreases during use and increases during charging.

The host-side software 218 is software that controls aspects of the operation of the host device 101. The host-side software 218 may include computer program instructions that are stored in the storage device 213, can loaded into the memory 212, and executed by the processor 211 of the host device 101. The functions performed by the host-side software 218 include connecting and disconnecting wireless communications with the wireless headphone device 102 in order to output audio using the wireless headphone device 102. The functions performed by the host-side software 218 include receiving information from the wireless headphone device 102 and storing that information for use in controlling battery charging. The functions performed by the host-side software 218 include controlling battery charging of the wireless headphone device 102. These and other functions that may be performed by the host-side software 218 will be described further herein.

Figure 3:
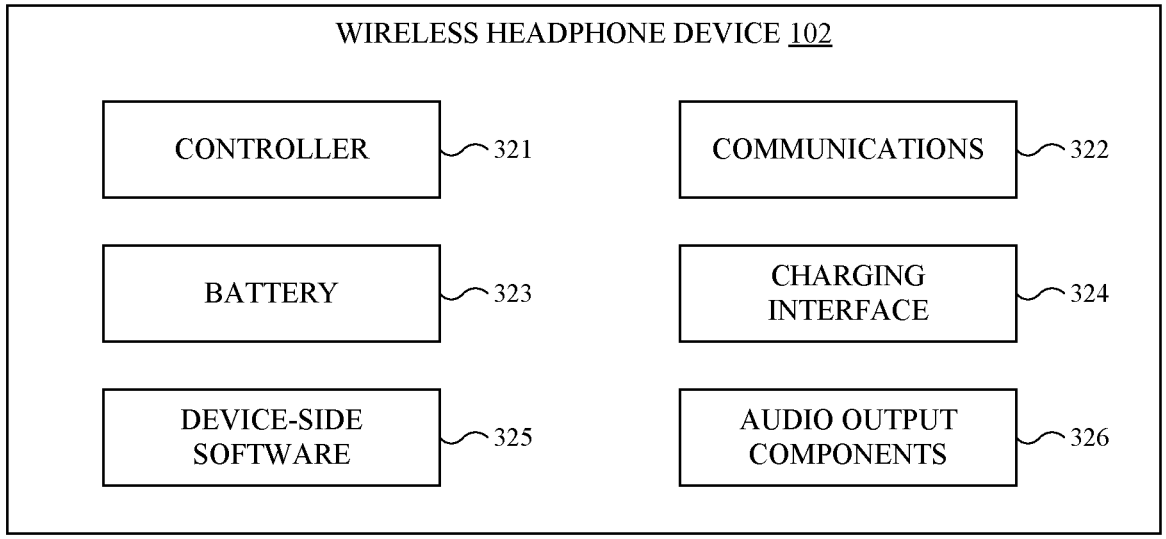
FIG. 3 is a block diagram that shows an example of a hardware configuration for a wireless headphone device.

FIG. 3 is an illustration that shows an example of a hardware configuration for the wireless headphone device 102. In the illustrated example, the wireless headphone device 102 includes a controller 321, a communications device 322, a battery 323, a charging interface 324, device-side software 325, and audio output components 326. Hardware components of the wireless headphone device 102 may be interconnected using conventional components such as a system bus.

The controller 321 is a computing device. The controller 321 may include example, including a processor, memory, and storage. The controller 321 may be or include an application-specific integrated circuit. The controller 321 may be or include a system on a chip. The controller 321 is operable to execute computer program instructions and perform operations described by the computer program instructions.

The communications device 322 is a short range wireless communications device. As an example, the communications device 322 may transmit information using radio frequencies. The communications device 322 may use conventional short range communications protocols or wireless networking protocols. The communications device 322 may use short range, lower power radio communication protocols, such as Bluetooth®, low power Bluetooth®, or Zigbee. The communications device 322 may be used by the wireless headphone device 102 to establish the first wireless communications connection with the host device 101. The communications device 322 may be used by the wireless headphone device 102 to establish the second wireless communications connection with the charging case 103.

The battery 323 is a power source (e.g., including battery cells) that is included in the wireless headphone device 102. The battery 323 is configured to supply electrical power to the various components of the wireless headphone device 102. The battery 323 is a rechargeable having a state of charge that decreases during use and increases during charging.

The charging interface 324 is an electrical connector (e.g., including conductive contacts or including an inductive charging structure) that is formed on the wireless headphone device 102. The charging interface 324 is configured to allow electrical connection to corresponding components of the charging case 103 so that the charging case 103 may supply electrical power to the wireless headphone device 102 in order to charge the battery 323 of the wireless headphone device 102 when the wireless headphone device 102 is located in the receptacle 105 of the charging case 103.

The device-side software 325 is software that controls aspects of the operation of the wireless headphone device 102. The device-side software 325 may include computer program instructions that are stored by and executed by the controller 321 of the wireless headphone device 102. The functions performed by the device-side software 325 include connecting and disconnecting wireless communications with the host device 101 and/or the charging case 103 in order to exchange information, commands, responses, etc., between the wireless headphone device 102, the host device 101, and the charging case 103. The functions performed by the device-side software 325 include controlling battery charging of the wireless headphone device 102. These and other functions that may be performed by the device-side software 325 will be described further herein.

The audio output components 326 are components that output sound that can be heard by a user. Conventional components may be used, such as loudspeakers (e.g., miniature loudspeakers).

Figure 4:
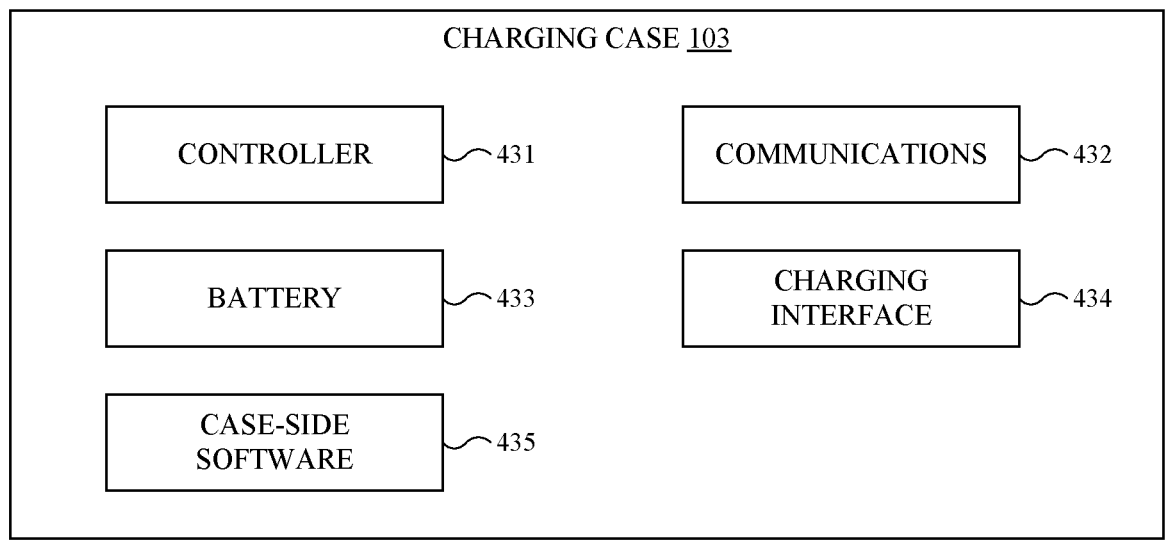
FIG. 4 is a block diagram that shows an example of a hardware configuration for a charging case.

FIG. 4 is an illustration that shows an example of a hardware configuration for the charging case 103. In the illustrated example, the wireless headphone device 102 includes a controller 431, a communications device 432, a battery 433, a charging interface 434, and case-side software 435. Hardware components of the charging case 103 may be interconnected using conventional components such as a system bus.

The controller 431 is a computing device. The controller 431 may include example, including a processor, memory, and storage. The controller 431 may be or include an application-specific integrated circuit. The controller 431 may be or include a system on a chip. The controller 431 is operable to execute computer program instructions and perform operations described by the computer program instructions.

The communications device 432 is a short range wireless communications device. As an example, the communications device 432 may transmit information using radio frequencies. The communications device 432 may use conventional short range communications protocols or wireless networking protocols. The communications device 432 may use short range, lower power radio communication protocols, such as Bluetooth®, low power Bluetooth®, or Zigbee. The communications device 432 may be used by the charging case 103 to establish the second wireless communications connection with the wireless headphone device 102.

The battery 433 is a power source (e.g., including battery cells) that is included in the charging case 103. The battery 433 is configured to supply electrical power to the various components of the charging case 103. The battery 433 is also be used by the charging case 103 as a power source (e.g., electrical power source) for charging the wireless headphone device 102. In addition, or as an alternative, the charging case 103 may use a wired connection to an external power supply as a power source for charging the wireless headphone device 102. The battery 433 is a rechargeable having a state of charge that decreases during use and increases when it is being charged by an external power source that supplies electrical power to the charging case 103.

The charging interface 434 is an electrical connector (e.g., including conductive contacts, or including an inductive charging structure) that is formed on the charging case 103. As an example, the charging interface 434 may be located in the receptacle 105 so that it is in contact with or adjacent to the charging interface 434 of the wireless headphone device 102 when the wireless headphone device 102 is located in the charging case 103.

The charging interface 434 is configured to allow electrical connection to corresponding components of the wireless headphone device 102, such as the charging interface 324 of the wireless headphone device 102. This allows the charging case 103 to supply electrical power to the wireless headphone device 102 from the battery 433 of the charging case 103 to the battery 323 of the wireless headphone device 102 in order to charge the battery 323 of the wireless headphone device 102 when the wireless headphone device 102 is located in the receptacle 105 of the charging case 103.

The case-side software 435 is software that controls aspects of the operation of the charging case 103. The case-side software 435 may include computer program instructions that are stored by and executed by the controller 431 of the wireless headphone device 102. The functions performed by the case-side software 435 include connecting and disconnecting wireless communications with the wireless headphone device 102 in order to exchange information, commands, responses, etc., between the charging case 103 and the wireless headphone device 102. The functions performed by the case-side software 435 include controlling battery charging of the wireless headphone device 102. These and other functions that may be performed by the case-side software 435 will be described further herein.

The charging system 100 controls charging of the battery 433 of the wireless headphone device 102 by the charging case 103 when the wireless headphone device 102 is located inside the charging case 103. Control of the charging process may be performed under control of functions included in the host-side software 218, the device-side software 325, and the case-side software 435, as will be explained herein.

Charging is controlled, in part, dependent on the state of charge of the battery 433 of the wireless headphone device 102. State of charge values are used to represent, the amount of electrical power that is stored in a battery, such as the battery 433 of the wireless headphone device 102. State of charge values are estimated. As one example, state of charge may be estimated based on voltage. As another example, state of charge may be estimated based on current integration over time. State of charge values are typically expressed as percentage values, relative to set points for zero percent and one-hundred percent, which may be predetermined values or calculated values. Zero percent state of charge is used to represent a charge state in which the battery 433 is not able to continue powering the wireless headphone device 102. One-hundred percent state of charge is used to represent a charge level at which further charging of the battery 433 is discontinued, and is therefore indicated to the user as a fully charged state.

Figure 5:
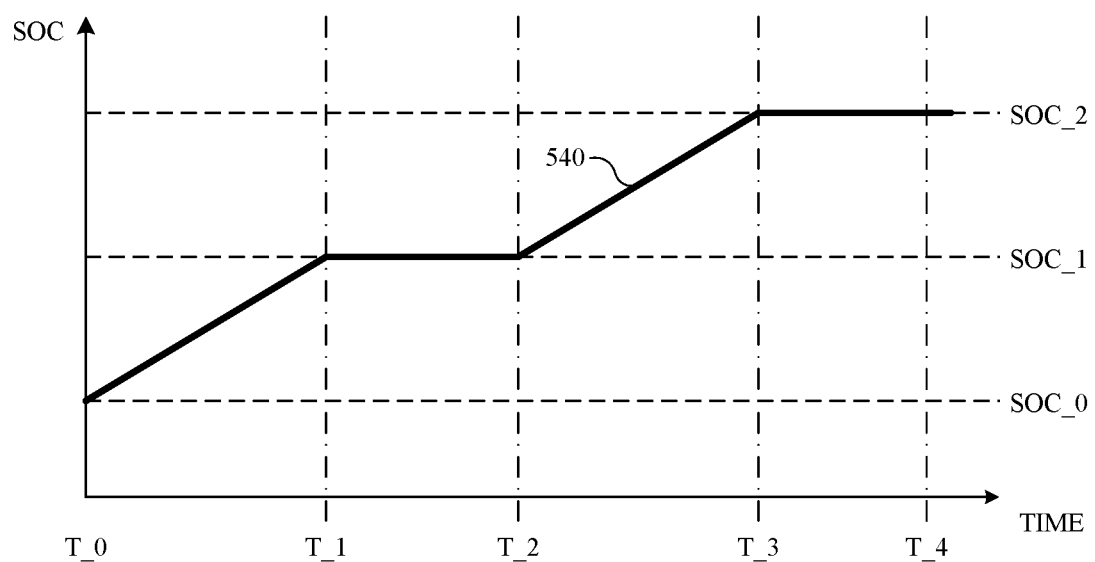
FIG. 5 is a graph that shows the magnitude of a state of charge value of the battery of the wireless headphone device with respect to time during a charging procedure performed using the charging system.

FIG. 5 is a graph that shows the magnitude of a state of charge value 540 of the battery 433 of the wireless headphone device 102 with respect to time during a charging procedure performed using the charging system 100.

Time point T_0 corresponds to placement of the wireless headphone device 102 in the charging case 103 and commencement of the charging operation. At time point T_0, the state of charge value 540 is equal to an initial state of charge value SOC_0.

As one example, charging may commence in response to placement of the wireless headphone device 102 in the receptacle 105 of the charging case 103. When the wireless headphone device 102 is in the receptacle 105, the charging case 103 is able to supply electrical power to the wireless headphone device 102. In particular, when the wireless headphone device 102 is in the receptacle 105, the charging interface 324 of the wireless headphone device 102 and the charging interface 434 of the charging case 103 are positioned so that they are operable to transfer electrical power, such as by engagement of included electrical contacts or placement of inductive charging coils in an operable positional relationship.

As another example, charging may commence in response to movement of the lid 106 of the charging case 103 from the open position to the closed position while the wireless headphone device 102 is in the receptacle 105 of the charging case 103. Movement of the lid 106 to the closed position may be determined by a signal output by the lid position sensor 107.

A first charging interval starts at time point T_0 and ends at time point T_1. Time point T_1 is reached when the state of charge value 540 reaches a first predetermined state of charge value SOC_1. At time point T_1, charging is stopped. The first charging interval from time point T_0 to time point T_1 has a first charging interval length that can be expressed in a unit of time such as minutes and/or seconds.

A first hold interval starts at time point T_1 and ends at time point T_2. The purposed of the first hold interval is to maintain the state of charge value 540 at a value (e.g., the first predetermined state of charge value SOC_1) that does not place undue stress on the battery 433 in order to prolong the functional life of the battery 433, which may be diminished if the state of charge value 540 is held at or near one-hundred percent for extended periods of time. The first hold interval extends over a first hold interval time, which can be expressed in a unit of time such as minutes and/or seconds.

Time point T_2 may be referred to herein as a resume time value. Time point T_2 represents a time at which charging should resume time value that corresponds to a time for charging to commence to allow for completion of charging from the first predetermined state of charge value SOC_1 to the second predetermined state of charge value SOC_2 prior to a usage time value, which is represented by time point T_4. The usage time value is a time value corresponds to estimated future usage of the wireless headphone device 102. The usage time value may be expressed as or correspond to an absolute time measurement in a coordinated time keeping system (e.g., UTC, another public coordinated timekeeping system, or a proprietary coordinated timekeeping system). Estimation of the usage time value will be described further herein.

The second predetermined state of charge value may correspond to full charging of the battery 433 (e.g., one-hundred percent state of charge). Charing from the first predetermined state of charge value SOC_1 to the second predetermined state of charge value SOC_2 occurs during a second charging interval from time point T_2 to time point T_3, and has a second charging interval length that can be expressed in a unit of time such as minutes or seconds.

Time point T_2 is set in dependence on the usage time value. The usage time value represents an estimated time at which the user will next attempt to use the wireless headphone device 102, including ending the charging operation, removing the wireless headphone device 102 from the charging case 103, and connecting (e.g., wirelessly) the wireless headphone device 102 to another device for the purpose of audio output by the wireless headphone device 102.

Based on the usage time value, the resume time value, represented by time point T_2, is set so that charging can be performed to increase the state of charge value 540 from the first predetermined state of charge value SOC_1 to the second predetermined state of charge value SOC_2 prior to the usage time value. The resume time value may be calculated based on the usage time value, by setting the resume time value so that charging will likely be completed before the user next uses the wireless headphone device 102.

In the illustrated example, the resume time value is set so that it is prior to the usage time value by subtracting an estimated length of the second charging interval (e.g., length of time between time point T_2 and time point T_3) from the usage time value and by subtracting an additional amount of time (e.g., length of time between time point T_3 and time point T_4) to account for deviations of the actual time when the device is next used from the usage time value. This additional amount of time may be, as examples, a fixed length of time, or a variable length of time calculated in any desired manner (e.g., based on statistical analysis of variability in user behavior). Thus, the resume time value may be expressed as or correspond to an absolute time measurement in a coordinated time keeping system.

Figure 6:
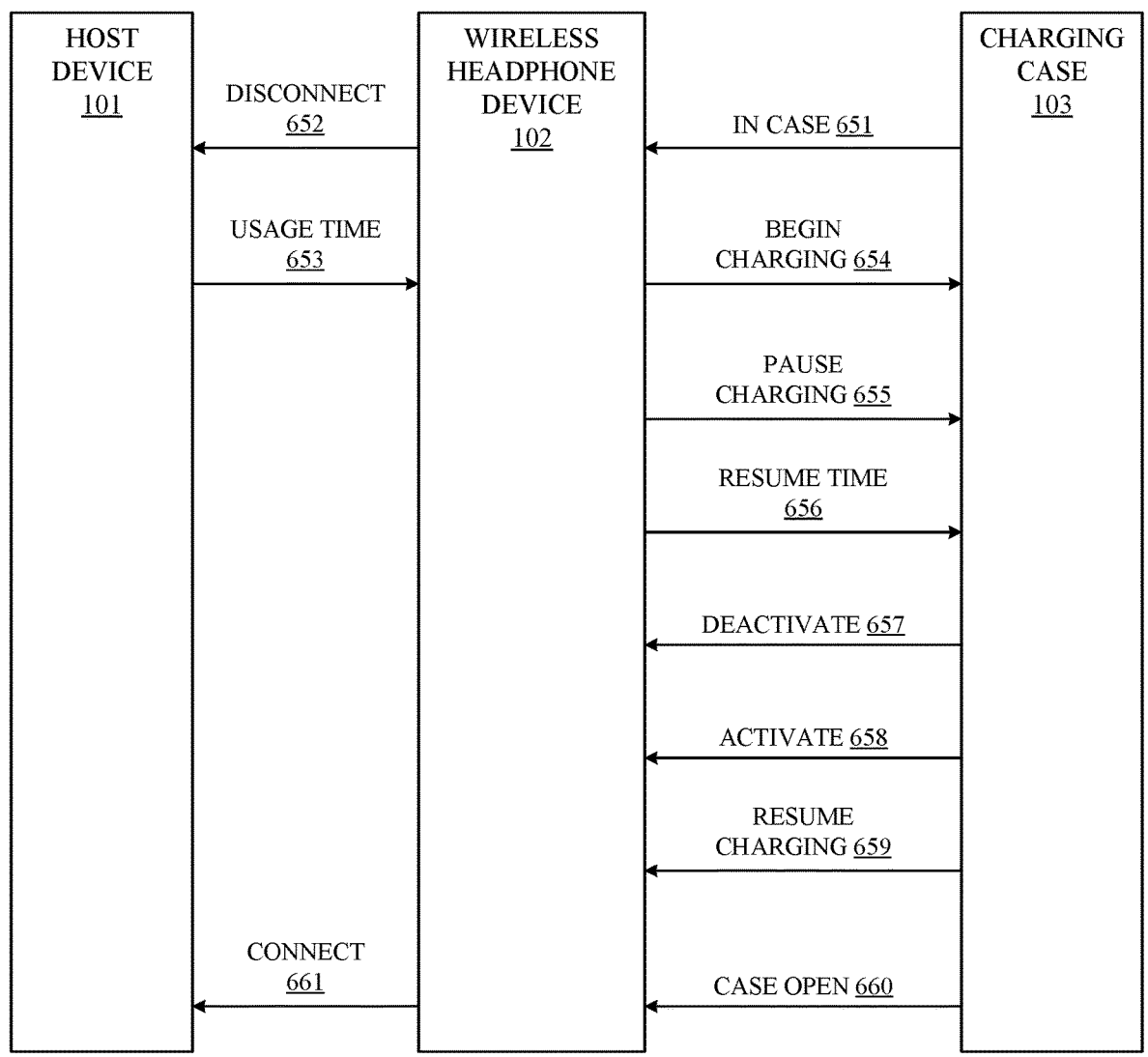
FIG. 6 is an illustration that shows operation of the charging system.

FIG. 6 is an illustration that shows operation of the charging system 100, including actions taken by and communications between the host device 101, the wireless headphone device 102, and the charging case 103. The operations and communications described in FIG. 6 are performed by the host device 101, the wireless headphone device 102, and the charging case 103, for example, using the host-side software 218, the device-side software 325, and the case-side software 435. Herein, the term "transmission" is used to refer to any manner of message, signal, or indication, received in any way, between two of the host device 101, the wireless headphone device 102, and the charging case 103.

When the wireless headphone device 102 is placed in the charging case 103, the charging case 103 may send (e.g., by wireless communication) a transmission 651 to the wireless headphone device 102 indicating that the wireless headphone device 102 is located in the charging case 103. Placement of the wireless headphone device 102 in the charging case 103 may be determined, for example, by engagement of the charging interface 434 of the charging case 103 with the charging interface 324 of the wireless headphone device 102. In response to the transmission 652, the wireless headphone device 102 sends a transmission 652 to the host device 101 requesting disconnection of the wireless communications link between the host device 101 and the wireless headphone device 102. In response, the host device 101 determines the usage time value and sends it to the wireless headphone device 102 in a transmission 653.

The wireless headphone device 102 may send a transmission 654 to the charging case 103 asking the charging case 103 to begin charging the wireless headphone device 102. In response, the charging case 103 begins supplying electrical power to the wireless headphone device 102 in order to charge the battery 323 of the wireless headphone device 102. This action corresponds to time point T_0 of FIG. 5, and begins the first charging interval. During the first charging interval, the wireless headphone device 102 monitors the state of charge value of the battery 323 of the wireless headphone device 102. When the state of charge value of the battery 323 of the wireless headphone device 102 reaches the first predetermined charge value (e.g., SOC_1 reached at time point T_1 of FIG. 5), the wireless headphone device 102 sends a transmission 655 to the charging case 103 asking the charging case 103 to pause charging of the battery 323 of the charging case 103. The wireless headphone device 102 also sends a transmission 656 to the charging case 103 indicating the resume time value. The resume time value may be determined, for example, by the wireless headphone device 102 using the device-side software 325 based on the usage time value, as previously described.

In response to the transmissions 655 and 656 from the wireless headphone device 102, the charging case 103 sends a transmission 657 (e.g., a sleep signal) to the wireless headphone device 102 to cause the wireless headphone device 102 to switch from an activated mode to a deactivated mode. The transmission 657 may be sent by a wireless communication or may be sent by a direct electrical connection, for example, using the charging interface 324 of the wireless headphone device 102 and the charging interface 434 of the charging case 103.

The activated mode is a normal operation state for the wireless headphone device 102, in which the battery 323 supplies electrical power to other systems of the wireless headphone device 102, such as the controller 321 of the wireless headphone device 102. The deactivated mode of the wireless headphone device 102 is intended to avoid discharging the battery 323 of the wireless headphone device 102 by disconnecting (e.g., by a relay) the battery 323 of the wireless headphone device 102 from some or all of the other components of the wireless headphone device 102. In some implementations, no electrical power from the battery 323 of the wireless headphone device 102 is used by the controller 321 of the wireless headphone device 102 in the deactivated mode. In some implementations, no electrical power from the battery 323 of the wireless headphone device 102 is used by the wireless headphone device 102 in the deactivated mode.

The wireless headphone device 102 remains in the deactivated mode during the hold interval, which corresponds to the time period between the first time point T_1 and the second time point T_2 of FIG. 5. Upon determining that the resume time has be reached (e.g., a current time is equal to or past the resume time value), the charging case 103 sends a transmission 658 (e.g., a wake signal) to the wireless headphone device 102 to cause the wireless headphone device 102 to enter the activated mode from the deactivated mode. The charging case 103 sends a transmission 659 to the wireless headphone device 102 to instruct the wireless headphone device 102 to resume charging. This corresponds to the second charge interval, represented by the time period between the second time point T_2 and the third time point T_3 of FIG. 5. Charing continues until the battery 323 reaches the second predetermined state of charge value (e.g., fully charged), at which time charging ends.

When the charging case 103 determines that the lid 106 has been opened and/or that the wireless headphone device 102 has been removed from the receptacle 105 of the charging case 103, the charging case 103 sends a transmission 660 to the wireless headphone device 102 indicating that the wireless headphone device 102 may be removed from the charging case 103. In response, the wireless headphone device 102 sends a transmission 661 to the host device 101 requesting connection of the wireless communications link between the host device 101 and the wireless headphone device 102, and the wireless communications link is then established.

As described above, the usage time value is an estimated value that corresponds to a predicted future use of the wireless headphone device 102 by a user for audio output. The usage time value is estimated based in part on connection history information regarding wireless communications between the wireless headphone device 102, the host device 101, and/or other devices that the wireless headphone device 102 has connected to. Estimating the usage time value is performed by the host device 101, for example, using a model that receives the connection history information for the wireless headphone device 102 as an input. Other inputs to the model may include the current time of day, the current day of the week, alarm clock settings, calendar events, and/or other types of inputs.

The connection history information is a record of wireless communication sessions during which the wireless headphone device is connected to the host device 101 or another device. Each of the wireless communication sessions may be associated with a connection time value that describes when the session began and a disconnection time value that describes when the session ended. Other information may be included in the connection history information, such as information describing the state of charge of the battery 323 of the wireless headphone device 102 at the time of connection and disconnection, and information that indicates instances of full discharge of the battery 323 of the wireless headphone device 102. Since the wireless headphone device 102 can connect to multiple devices, including the host device 101, the connection history information for the wireless headphone device 102 may be aggregated across those devices (e.g., by transmission to a server) and be made available to the host device 101 for use in estimating the usage time value.

Figure 7:
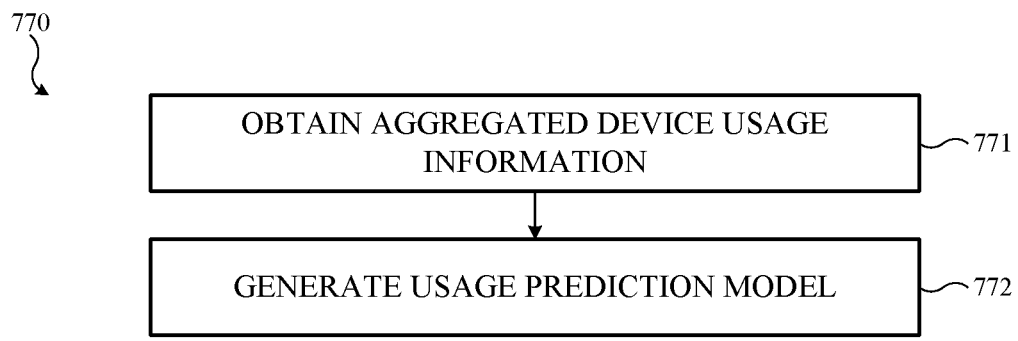
FIG. 7 is a flowchart that shows an example of a process for generating a sage prediction model.

FIG. 7 is a flowchart that shows a process 770 for generating a usage prediction model. The process 770 may be performed, for example, using a computing device that executes program instructions that implement the operations of the process 770. The process 770 may be implemented using a non-transitory computer-readable storage device having program instructions that, when executed by a computing device, cause performance of the operations of the process 770 by the computing device.

In operation 771, aggregated device usage information is obtained from a large number of devices. Each of the devices may be similar to the wireless headphone device 102 in structure and/or function. The aggregated device usage information includes information from each of those devices, including, for example, information describing times at which wireless communication connections between the device and a host device were connected and disconnected. The aggregated device usage information is anonymized by removing any personal identifying information from the information when it is aggregated.

In operation 772, a usage prediction model is generated. The usage prediction model is a machine-learning based model that receives the connection history information as an input and outputs the usage time value. The usage prediction model is trained using aggregated device usage information that was obtained in operation 771. As one example, the aggregated device using information may be divided into two groups of information, with one of the groups being used as training samples and one the groups being used as ground truth information for back testing.

Figure 8:
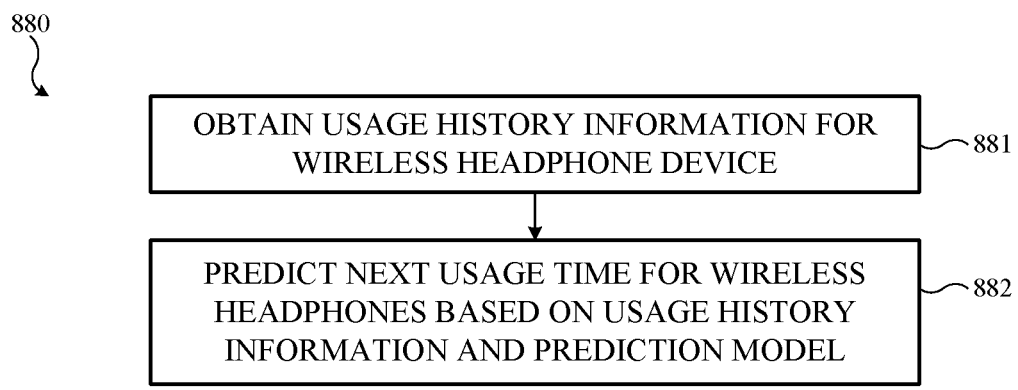
FIG. 8 is a flowchart that shows an example of a process for estimating a usage time value.

FIG. 8 is a flowchart that shows a process 880 for estimating the usage time value for use in charging control when charging the wireless headphone device 102 using the charging case 103. The process 880 may be performed, for example, using a computing device that executes program instructions that implement the operations of the process 880. The process 880 may be implemented using a non-transitory computer-readable storage device having program instructions that, when executed by a computing device, cause performance of the operations of the process 880 by the computing device.

In operation 881 usage history information is obtained for the wireless headphone device 102. Operation 881 may be performed by the host device 101. As one example, the usage history information can be tracked and stored by the host device 101. As another example, the usage history information can be obtained by the host device 101 from a server that aggregates information regarding usage of the wireless headphone device 102 from multiple devices.

In operation 882, a next usage time is predicted for the wireless headphone device 102 based on the usage history information and a prediction model (e.g., the prediction model generated according to the process 770). Other information can be used, such as a current time of day, alarm clock settings, and calendar information.

Figure 9:
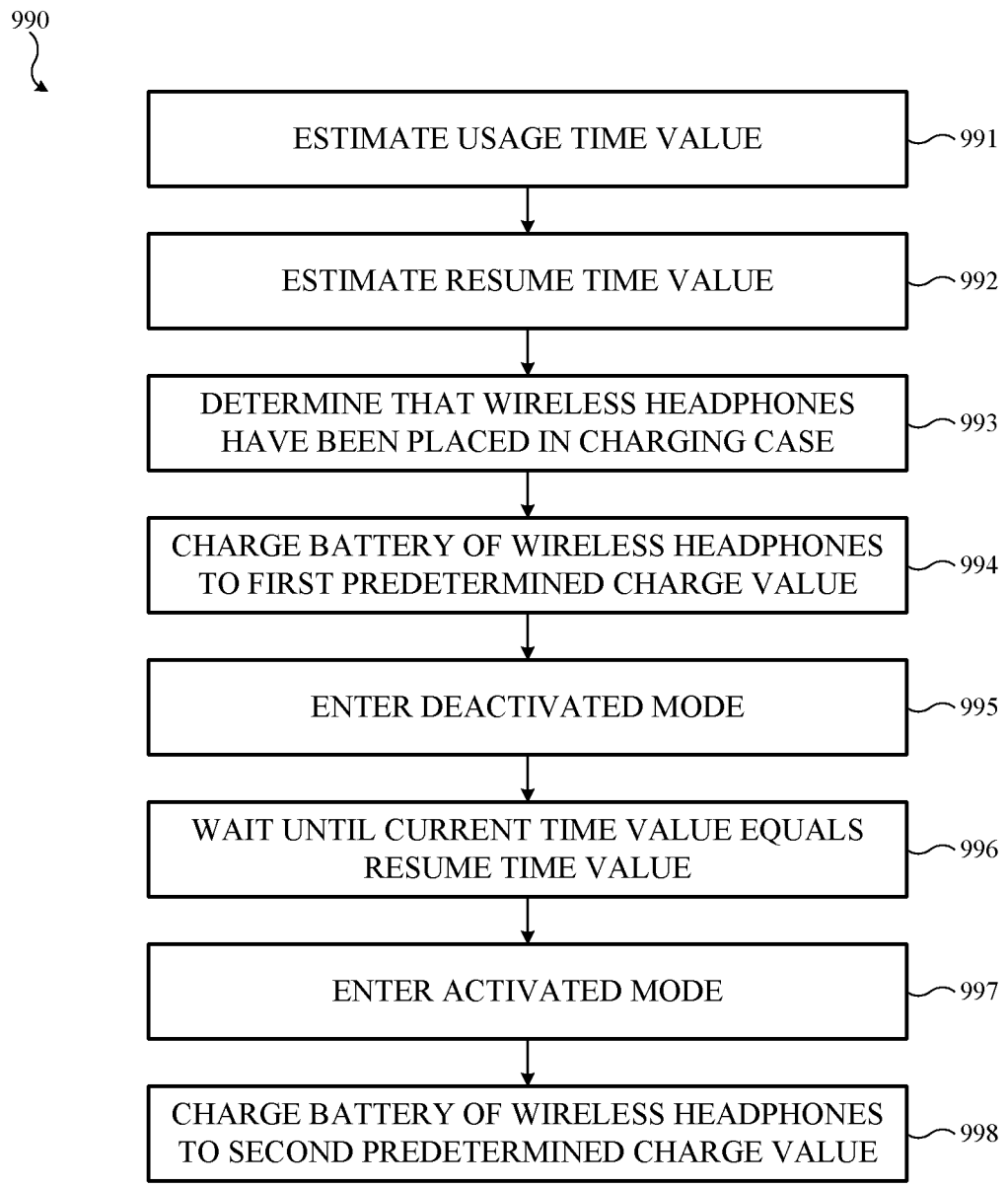
FIG. 9 is a flowchart that shows an example of a process for charging control.

FIG. 9 is a flowchart that shows a process 990 for charging control when charging the wireless headphone device 102 using the charging case 103. The process 990 may be performed, for example, using a computing device that executes program instructions that implement the operations of the process 990. The process 990 may be implemented using a non-transitory computer-readable storage device having program instructions that, when executed by a computing device, cause performance of the operations of the process 990 by the computing device.

Operation 991 includes estimating a usage time value that corresponds to an anticipated future occurrence of usage of the wireless headphone device 102 for audio output. As an example, estimating the usage time value may be performed by the host device 101 based in part on connection history information regarding wireless communications between the wireless headphone device 102 and the host device 101. Estimating the usage time value may performed using a machine-learning based prediction model that receives the connection history information as an input.

Estimating the usage time value may be performed periodically, or in response to certain events. As one example, estimating the usage time value may be performed according to predetermined time intervals. As another example, estimating the usage time value can be performed in response to connection of the wireless communications link between the host device 101 and the wireless headphone device 102. As another example, estimating the usage time value can be performed in response to a request for disconnection of the wireless communications link between the host device 101 and the wireless headphone device 102. As another example, estimating the usage time value can be performed when the wireless headphone device 102 is placed in the charging case 103.

Operation 992 includes estimating a resume time value that corresponds to a time for charging to commence to allow for completion of charging from a first predetermined state of charge value to a second predetermined state of charge value by the usage time value. As an example, the resume time value may be estimated by subtracting an expected charging time from the usage time value. The expected charging time represents an amount of time required to charge the battery 323 of the wireless headphone device 102 from the first predetermined state of charge value to the second predetermined state of charge value.

Estimating the resume time value may be performed periodically, or in response to certain events. As one example, estimating the resume time value may be performed each time the usage time value is estimated. As another example, estimating the resume time value can be performed when the wireless headphone device 102 is placed in the charging case 103.

In some implementations of the process 990, the usage time value is transmitted from the host device 101 to a controller 321 of the wireless headphone device 102, the resume time value is determined by the controller 321 of the wireless headphone device 102, and the resume time value is transmitted from the wireless headphone device 102 to the charging case 103.

Operation 993 includes determining that the wireless headphone device 102 has been placed in the charging case 103. As one example, electrical connection of the wireless headphone device 102 to the charging case 103 can be detected.

Operation 994 includes charging the battery 323 of the wireless headphone device 102 using electrical power supplied by the charging case until a current state of charge of the battery 323 reaches the first predetermined state of charge value. Charging the battery 323 of the wireless headphone device 102 may include supplying electrical power from the battery 433 of the charging case 103 to the wireless headphone device 102 using the charging interface 324 of the wireless headphone device 102 and the charging interface 434 of the charging case 103.

Operation 995 includes entering, by the wireless headphone device, a deactivated mode. Operation 995 is performed after the current state of charge reaches the first predetermined state of charge value. In some implementations, no electrical power from the battery 323 of the wireless headphone device 102 is used by the wireless headphone device 102 in the deactivated mode. In some implementations, a minimal amount of electrical power from the battery 323 of the wireless headphone device 102 is used by the wireless headphone device 102 in the deactivated mode, such as by powering down one or more components such as the controller 321 or the communications device 322 of the wireless headphone device 102.

The charging case 103 is configured to return the wireless headphone device 102 to the activated mode according to the resume time value so that charging of the wireless headphone device 102 may resume, for example, in the manner described with respect to operation 996, operation 997, and operation 998. Operation 996 includes waiting until a current time value reaches the resume time value. Operation 997 includes entering, by the wireless headphone device 102, an activated mode. Operation 997 may be performed in response to a wake signal that is output by the charging case 103 and is received by the wireless headphone device 102. As an example, the charging case 103 may output the wake signal in response to determining that the current time is equal to or past the resume time value. As an example, the wake signal may be an electrical signal that is output by the charging case 103 to the wireless headphone device 102 across the charging interface 434 of the charging case 103 and the charging interface 324 of the wireless headphone device 102.

Operation 998 include charging the battery 323 of the wireless headphone device 102 using electrical power supplied by the charging case 103 until the current state of charge of the battery 323 of the charging case 103 reaches the second predetermined state of charge value.

As an example, the first predetermined state of charge value may be between seventy percent and ninety percent of a fully-charged state of charge value of the battery 323 of the wireless headphone device 102, and the second predetermined state of charge value may be at least ninety-five percent of a fully charged state of charge value of the battery 323 of the wireless headphone device 102.

Some implementations of the process 990 may alert the user if the user attempts to remove the wireless headphone device 102 from the charging case 103 before the wireless headphone device 102 is fully charging. For example, this may occur upon sensing that the lid 106 of the charging case 103 has been opened. As an example, alerting the user may include outputting a notification at the host device 101 in response to detecting an attempt to use the wireless headphone device 102 before the current state of charge of the battery 323 of the wireless headphone device 102 reaches the second predetermined state of charge value.

In some implementations, a determination can be made as to whether to use the optimized charging method of the process 990. As one example, optimized charging according to the process 990 if the time between the current time and the usage time value is less than a time required for charging or does not exceed the time required for charging by a threshold value. As another example, if the battery 323 of the wireless headphone device 102 has been fully discharged (e.g., so that the wireless headphone device 102 is no longer able to be powered by the battery 323), optimized charging according to the process 990 may be disabled the next time that the battery is charged. This avoids using a usage time value (e.g., expressed using a relative measurement as opposed to an absolute measurement) without knowledge of the amount of time that has passed while the wireless headphone device 102 was not operational on account of having been fully discharged. Thus, entry into the deactivated mode may be disabled if the battery of the wireless headphone device 102 is fully discharged before the battery 323 of the wireless headphone device 102 is placed into the charging case 103 and is charged by the electrical power supplied by the charging case 103 until the current state of charge of the battery 323 reaches the first predetermined state of charge value.

Figure 10:
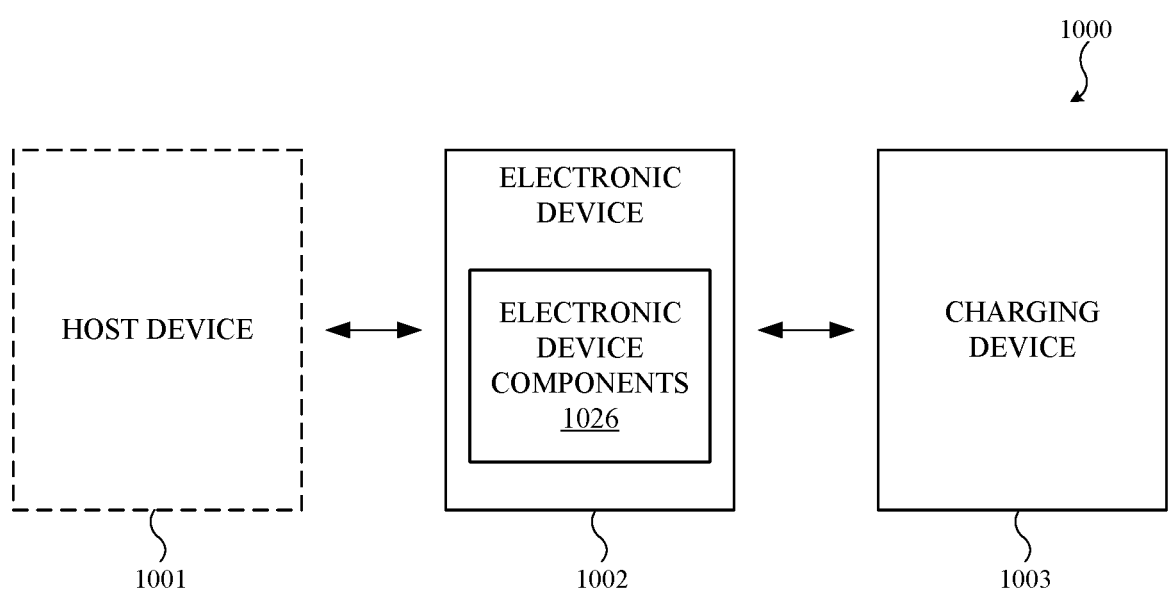
FIG. 10 is an illustration that shows an alternative example of a charging system.

FIG. 10 is an illustration that shows an example of a charging system 1000 that is configured to control charging of a rechargeable battery. The charging system 1000 includes a host device 1001, electronic device 1002, and a charging device 1003. The charging system 1000 is an alternative implementation of the charging system 100 and the description of the charging system 100 and its components is applicable to the charging system 1000 except as explicitly contradicted herein.

The host device 1001 is an electronic device that is able to communicate wirelessly with the electronic device 1002. The host device 1001 may be, as examples, a desktop computer, a laptop computer, a tablet computer, a smart watch, or a smart phone. The host device 1001 may be implemented in the same manner as described with respect to the host device, inclusive of the hardware configuration described with respect to FIG. 2 and all components thereof. The description of the host device 101 is applicable to the host device 1001 except as explicitly contradicted herein. In some implementations, the electronic device 1002 does not require communication with the host device 1001 in order to operate, and the host device 1001 may be omitted from the charging system 1000. The host device 1001 may communicate with the electronic device 1002 and/or the charging device 1003 using a wireless communication connection as previously described. The host device 1001 may transmit information (e.g., signals or data) to the electronic device 1002 to facilitate operation of the electronic device 1002 in some implementations.

The electronic device 1002 is any type of rechargeable electronic device. As examples, the electronic device 1002 may be a wireless headphone device of any type, a smart watch, a smart wristband, a smart phone, a laptop computer, a tablet computer, a smart speaker, a camera, a robot, an aerial vehicle, a wearable computer-generated reality device, or other type of device.

The hardware configuration for the electronic device 1002 can be the same as described with respect to the wireless headphone device 102 with respect to FIG. 3, including all components thereof, except that the audio output components 326 are omitted in favor of electronic device components 1026 that implement functions specific to the type of device that corresponds to the electronic device 1002 in a particular implementation. The electronic device components 1026 include components that utilize electrical power from the battery 323. The electronic device components 1026 may include audio output components (e.g., loudspeakers), display components such as display screens, sensor systems, and other types of components.

The charging device 1003 is a device that is configured to charge the battery or batteries of the electronic device 1002. The charging device 1003 includes an electrical charging connector (e.g., an inductive electrical charging connector such as coils, or a conductive electrical charging connector such as conductive contacts). The charging device 1003 may be a charging cord. The charging device 1003 may be an inductive charging mat. The charging device 1003 may be a charging case that is configured to receive the electronic device inside it, optionally close with a lid, and charge the electronic device 1002 while it is located in the charging case, e.g., using an inductive or conductive electrical charging connector. The charging device 1003 may have a configuration similar to that described with respect to the charging case 103, including all of the components described with respect to the charging case 103. The charging device 1003 may communicate with the electronic device 1002 using a wireless communication connection in the same manner described with respect to the charging case 103 and the wireless headphone device 102. The hardware configuration for the charging device 1003 can be the same as described with respect to the charging case 103 with respect to FIG. 4, including all components thereof.

The description and illustration of FIG. 5 is applicable to the charging system 1000 except as described to the contrary herein. Time point T_0 corresponds to electrical connection of the electronic device 1002 to the charging device 1003 and commencement of the charging operation. Time point T_0 may correspond to placement of the electronic device 1002 in a charging case in implementations where the charging device 1003 is a charging case, or time point T_0 may correspond to a time at which an inductive or conductive charging connection is established. The first charging interval, the first hold interval, the second charging interval, and other concepts from described with respect to FIG. 5 may be applied to the charging system 1000 as previously described.

Operation of the charging system 1000 is similar to operation of the charging system 100, except as described to the contrary herein.

When the electronic device 1002 is connected to the charging device 1003, the charging device 1003 may send (e.g., by wireless communication) a transmission to the electronic device 1002 indicating the charging connection. Wireless communication between the electronic device 1002 and the host device 1001 may be disconnected or maintained depending on the application.

In the charging system 1000, the usage time value and the resume time value may be determined at any of the host device 1001, the electronic device 1002, or the charging device 1003 by controllers associated with them, such as the processor 211 of the host device 1001, the controller 321 of the electronic device 1002, or the controller 431 of the charging device 1003. The usage time value and/or the resume time value may be transmitted to the charging device 1003 to allow the charging device 1003 to manage part of or all of the charging process. Portions of the charging process, such as initiation of the charging process and a request to transition from the activated mode to the deactivated mode. As an example, in some implementations, transmissions 654, 655, 656, 657, 658, and 659 are made between the electronic device 1002 and the charging device 1003 in the manner previously described.

In some implementations, transmission 660 may be triggered by disconnection of electronic device 1002 from its charging connection with the charging device 1003, such as disengagement of the inductive or conductive charging connection. Transmission 660 may also be triggered by opening of the charging device 1003 or removal of the electronic device 1002 from the charging device 1003 in implementations in which the charging device 1003 is a charging case. In implementations that include the host device 1001, the transmission 661 may be sent from the electronic device 1002 to the host device 1001 as previously described.

In the charging system 1000, the usage time value is an estimated value that corresponds to a predicted future use of the electronic device 1002. As one example, the usage time value may be estimated based in part on connection history information regarding wireless communications between the electronic device 1002, the host device 1001, and/or other devices that the electronic device 1002 has connected to as described with respect to the charging system 1000. As another example, the usage time value may be estimated based on charging history information for the electronic device 1002, describing times and optionally on specified dates) at which charging commenced, the durations of the charging operations, and/or the times at which charging ended. The charging history information may be collected and/or stored by the host device 1001, the electronic device 1002, the charging device 1003, and/or an external device such as a server, and transmitted to the device responsible for estimation as needed. Estimating the usage time value may be performed by the host device 1001, the electronic device 1002 and or by the charging device 1003, for example, using a model (e.g., a trained machine learning model) that receives the connection history information, the charging history information, or both, as an input. Other inputs to the model may include the current time of day, the current day of the week, alarm clock settings, calendar events, and/or other types of inputs.

Figure 11:
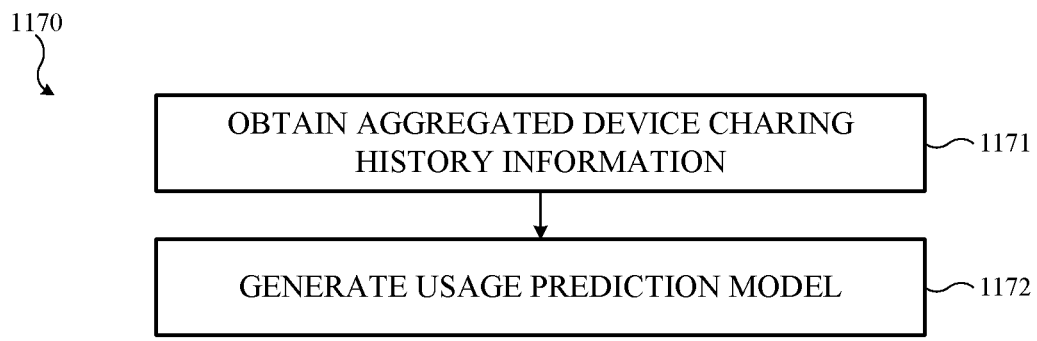
FIG. 11 is a flowchart that shows an example of a process for generating a usage prediction model for the charging system of FIG. 10.

FIG. 11 is a flowchart that shows a process 1170 for generating a usage prediction model using charging history information. The process 1170 may be performed, for example, using a computing device that executes program instructions that implement the operations of the process 1170. The process 1170 may be implemented using a non-transitory computer-readable storage device having program instructions that, when executed by a computing device, cause performance of the operations of the process 1170 by the computing device.

In operation 1171, aggregated device charging history information is obtained from a large number of devices. Each of the devices may be similar to the electronic device 1002 in structure and/or function. The aggregated device charging history information includes information from each of those devices, including, for example, information describing times at which charging started, ended, and charging durations. The aggregated device charging history information is anonymized by removing any personal identifying information from the information when it is aggregated.

In operation 1172, a usage prediction model is generated. The usage prediction model is a machine-learning based model that receives the charging history information as an input and outputs the usage time value. The usage prediction model is trained using aggregated device charging history information that was obtained in operation 1171. As one example, the aggregated device using information may be divided into two groups of information, with one of the groups being used as training samples and one the groups being used as ground truth information for back testing.

Figure 12:
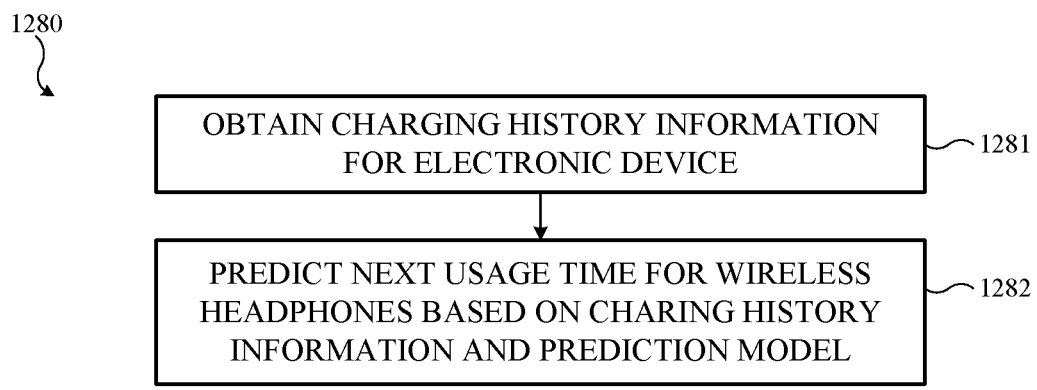
FIG. 12 is a flowchart that shows an example of a process for estimating a usage time value for the charging system of FIG. 10.

FIG. 12 is a flowchart that shows a process 1280 for estimating the usage time value for use in charging control when charging the electronic device 1002 using the charging device 1003. The process 1280 may be performed, for example, using a computing device that executes program instructions that implement the operations of the process 1280. The process 1280 may be implemented using a non-transitory computer-readable storage device having program instructions that, when executed by a computing device, cause performance of the operations of the process 1280 by the computing device. As one example, the process 1280 may be performed by a controller of the host device 1001. As one example, the process 1280 may be performed by a controller of the electronic device 1002. As one example, the process 1280 may be performed by a controller of the charging device 1003.

In operation 1281 charging history information is obtained for the electronic device 1002. Operation 1281 may be performed by the host device 1001, the electronic device 1002, or the charging device 1003, any of which devices may track and store the usage history information. As another example, the usage history information can be obtained by the host device 1001, the electronic device 1002, or the charging device 1003 from a server that aggregates information regarding charging of the electronic device 1002 from multiple devices.

In operation 1282, a next usage time is predicted for the electronic device 1002 based on the charging history information and a prediction model (e.g., the prediction model generated according to the process 1170). Other information can be used, such as a current time of day, alarm clock settings, and calendar information.

Figure 13:
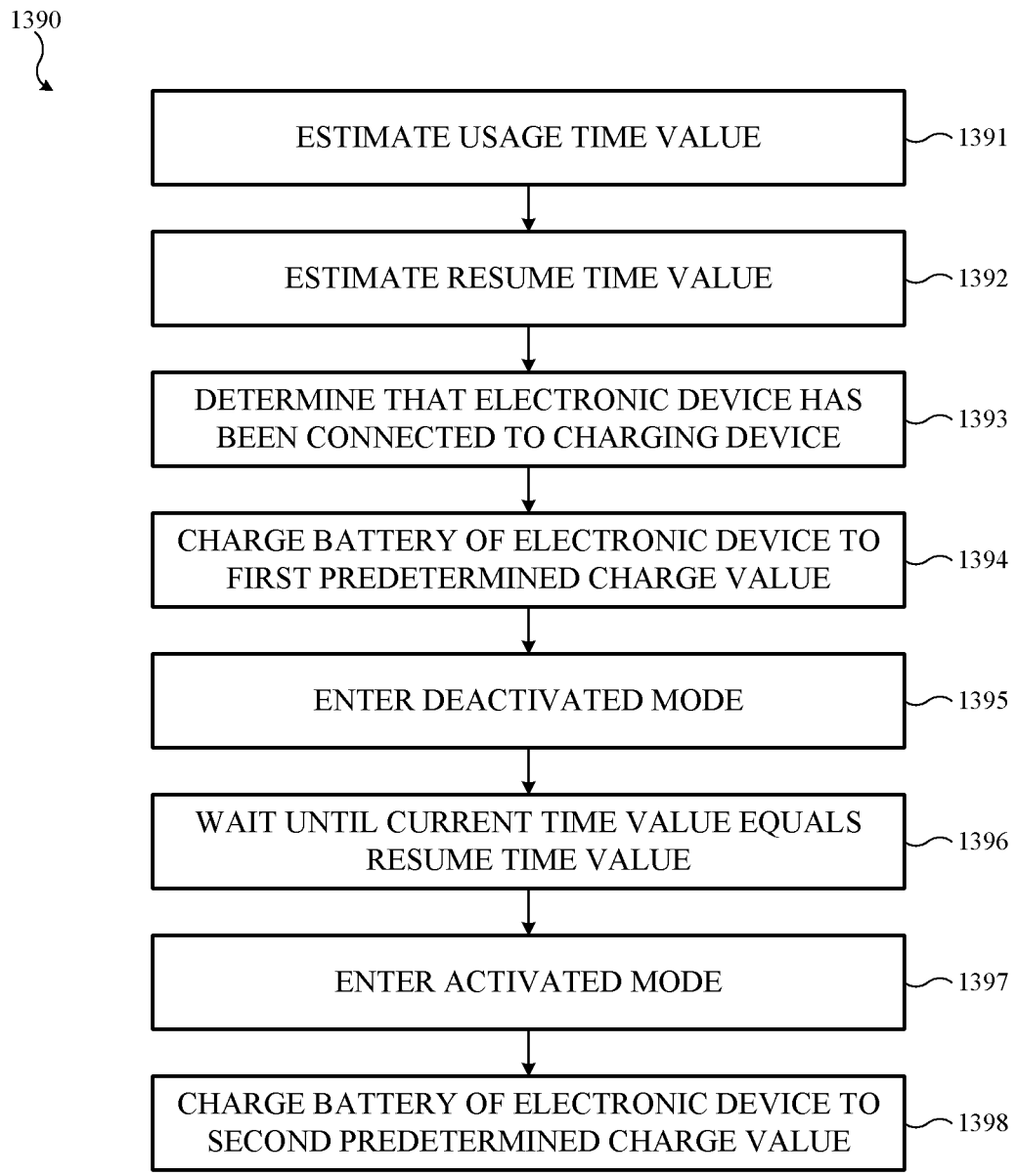
FIG. 13 is a flowchart that shows an example of a process for charging control for the charging system of FIG. 10.

FIG. 13 is a flowchart that shows a process 1390 for charging control when charging the electronic device 1002 using the charging device 1003. The process 1390 may be performed, for example, using a computing device that executes program instructions that implement the operations of the process 1390. The process 1390 may be implemented using a non-transitory computer-readable storage device having program instructions that, when executed by a computing device, cause performance of the operations of the process 1390 by the computing device.

Operation 1391 includes estimating a usage time value that corresponds to an anticipated future occurrence of usage of the electronic device 1002. As one example, estimating the usage time value may be performed based on charging history information for the electronic device 1002. As another example, estimating the usage time value may be performed based on connection history information regarding wireless communications between the electronic device 1002 and the host device 1100. In some implementations, estimating the usage time value is performed by the processor 211 of the host device 1001. In some implementations, estimating the usage time value is performed by the controller 321 the electronic device 1002. In some implementations, estimating the usage time value is performed by the controller 431 of the charging device 1003. Estimating the usage time value may performed using a machine-learning based prediction model that receives the charging history information as an input. Estimating the usage time value may performed using a machine-learning based prediction model that receives the connection history information as an input.

Estimating the usage time value may be performed periodically, or in response to certain events. As one example, estimating the usage time value may be performed according to predetermined time intervals. As another example, estimating the usage time value can be performed in response to connection of the wireless communications link between the host device 1001 and the electronic device 1002. As another example, estimating the usage time value can be performed in response to a request for disconnection of the wireless communications link between the host device 1001 and the electronic device 1002. As another example, estimating the usage time value can be performed when the electronic device 1002 is placed in the charging device 1003.

Operation 1392 includes estimating a resume time value that corresponds to a time for charging to commence to allow for completion of charging from a first predetermined state of charge value to a second predetermined state of charge value by the usage time value. The resume time value is determined based on the usage time value. As an example, the resume time value may be estimated by subtracting an expected charging time from the usage time value. The expected charging time represents an amount of time required to charge the battery 323 of the electronic device 1002 from the first predetermined state of charge value to the second predetermined state of charge value.

Estimating the resume time value may be performed periodically, or in response to certain events. As one example, estimating the resume time value may be performed each time the usage time value is estimated. As another example, estimating the resume time value can be performed when the electronic device 1002 is electrically connected to the charging device 1003.

In some implementations of the process 1390, the usage time value is estimated by the controller 321 of the electronic device 1002, the usage time value is transmitted from the electronic device 1002 to the charging device 1003, and the resume time value is determined by the controller 431 of the charging device 1003 based on the usage time value.

In some implementations of the process 1390, the usage time value is estimated by the controller 321 of the electronic device 1002, the resume time value is determined by the controller 321 of the electronic device 1002 based on the usage time value, and the resume time value is transmitted from the electronic device 1002 to the charging device 1003.

In some implementations of the process 1390, the usage time value is estimated by the controller 431 of the charging device 1003, and the resume time value is determined by the controller 431 of the charging device 1003 based on the usage time value.

In some implementations of the process 1390, the usage time value is estimated by the processor 211 of the host device 1001, the usage time value is transmitted from the host device 1001 to the charging device 1003, and the resume time value is determined by the controller 431 of the charging device 1003 based on the usage time value.

In some implementations of the process 1390, the usage time value determined by the processor 211 of the host device 1001, the usage time value is transmitted from the host device 1001 to the electronic device 1002, the resume time value is determined by the controller 321 of the electronic device 1002, and the resume time value is transmitted from the electronic device 1002 to the charging device 1003.

Operation 1393 includes determining that the electronic device 1002 has been electrically connected to the charging device 1003. As one example, an electrical connection (e.g., conductive or inductive) of the electronic device 1002 to the charging device 1003 can be detected by a continuity check or similar methods.

Operation 1394 includes charging the battery 323 of the electronic device 1002 using electrical power supplied by the charging device 1003 until a current state of charge of the battery 323 reaches the first predetermined state of charge value. Charging the battery 323 of the electronic device 1002 may include supplying electrical power from the battery 433 of the charging device 1003 to the electronic device 1002 using the charging interface 324 of the electronic device 1002 and the charging interface 434 of the charging device 1003.

Operation 1395 includes entering, by the electronic device 1002, a deactivated mode. Operation 1395 is performed after the current state of charge reaches the first predetermined state of charge value. In some implementations, no electrical power from the battery 323 of the electronic device 1002 is used by the electronic device 1002 in the deactivated mode. In some implementations, a minimal amount of electrical power from the battery 323 of the electronic device 1002 is used by the electronic device 1002 in the deactivated mode, such as by powering down one or more components such as the controller 321 or the communications device 322 of the electronic device 1002.

The charging device 1003 is configured to return the electronic device 1002 to the activated mode according to the resume time value so that charging of the electronic device 1002 may resume, for example, in the manner described with respect to operation 1396, operation 1397, and operation 1398. Operation 1396 includes waiting until a current time value reaches the resume time value. Operation 1397 includes entering, by the electronic device 1002, an activated mode. Operation 1397 may be performed in response to a wake signal that is output by the charging device 1003 and is received by the electronic device 1002. As an example, the charging device 1003 may output the wake signal in response to determining that the current time is equal to or past the resume time value. As an example, the wake signal may be an electrical signal that is output by the charging device 1003 to the electronic device 1002 across the charging interface 434 of the charging device 1003 and the charging interface 324 of the electronic device 1002.

Operation 1398 includes charging the battery 323 of the electronic device 1002 using electrical power supplied by the charging device 1003 until the current state of charge of the battery 323 of the charging device 1003 reaches the second predetermined state of charge value.

As an example, the first predetermined state of charge value may be between seventy percent and ninety percent of a fully-charged state of charge value of the battery 323 of the electronic device 1002, and the second predetermined state of charge value may be at least ninety-five percent of a fully charged state of charge value of the battery 323 of the electronic device 1002.

Some implementations of the process 1390 may alert the user if the user attempts to remove the electronic device 1002 from the charging device 1003 before the electronic device 1002 is fully charging. For example, this may occur upon sensing that the electronic device has been disconnected from the charging device 1003 or detecting that the electronic device 1002 has been moved with respect to the electronic device 1002. As an example, alerting the user may include outputting a notification at the host device 1001 or the electronic device 1002 in response to detecting an attempt to use the electronic device 1002 before the current state of charge of the battery 323 of the electronic device 1002 reaches the second predetermined state of charge value.

In some implementations, a determination can be made as to whether to use the optimized charging method of the process 1390. As one example, optimized charging according to the process 1390 if the time between the current time and the usage time value is less than a time required for charging or does not exceed the time required for charging by a threshold value. As another example, if the battery 323 of the electronic device 1002 has been fully discharged (e.g., so that the electronic device 1002 is no longer able to be powered by the battery 323), optimized charging according to the process 1390 may be disabled the next time that the battery is charged. This avoids using a usage time value (e.g., expressed using a relative measurement as opposed to an absolute measurement) without knowledge of the amount of time that has passed while the electronic device 1002 was not operational on account of having been fully discharged. Thus, entry into the deactivated mode may be disabled if the battery of the electronic device 1002 is fully discharged before the battery 323 of the electronic device 1002 is placed into the charging device 1003 and is charged by the electrical power supplied by the charging device 1003 until the current state of charge of the battery 323 reaches the first predetermined state of charge value.

As described above, one aspect of the present technology is the gathering and use of data available from various sources for use in determining how to control charging of devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to store user activity information that allows device charging to be performed in a way that improves battery life of devices. Further, other uses for personal information data that benefit, the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, systems that use the present technology can be configured to allow users to select to "opt in" or "opt out" of participation in the collection of personal information data during registration for services or anytime thereafter. In another example, users can select not to provide personal information to services that use the present technology. In yet another example, users can select to limit the length of time personal information is maintained by services that use the present technology, or users may entirely prohibit use of personal information by systems that use the present technology. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, charging of devices may be controlled using a model based on non-personal information data or a bare minimum amount of personal information, other non-personal information available to the services that are using the present technology, or publicly available information.

What is claimed is:

1. A method of controlling charging of an electronic device, comprising:
   estimating a usage time value that corresponds to an estimated time at which the user will next attempt to use the electronic device;
   estimating a resume time value that corresponds to a time for charging to commence to allow for completion of charging from a first predetermined state of charge value to a second predetermined state of charge value by the usage time value;
   charging a battery of the electronic device using electrical power supplied by a charging device until a current state of charge of the battery reaches the first predetermined state of charge value;
   entering, by the electronic device, a deactivated mode after the current state of charge reaches the first predetermined state of charge value; and
   causing the electronic device to return to an activated mode according to the resume time value.

2. The method of claim 1, wherein causing the electronic device to return to the activated mode according to the resume time value includes transmitting a wake signal from the charging device to the electronic device after a current time value reaches the resume time value, wherein the electronic device is configured to enter the activated mode in response to receiving the wake signal.

3. The method of claim 1, further comprising:
   subsequent to returning to the activated mode, charging the battery of the electronic device using electrical power supplied by the charging device until the current state of charge of the battery reaches the second predetermined state of charge value.

4. The method of claim 1, wherein the charging device is a charging case and the electronic device is located in the charging case when the electronic device is electrically connected to the charging device.

5. The method of claim 1, wherein estimating the usage time value is performed based on charging history information for the electronic device.

6. The method of claim 1, wherein estimating the usage time value is performed based on connection history information regarding wireless communications between the electronic device and a host device.

7. The method of claim 1, wherein estimating the usage time value is performed by a controller of the electronic device.

8. The method of claim 1, wherein estimating the usage time value is performed by a controller of the charging device.

9. A non-transitory computer-readable storage device including program instructions executable by one or more processors that, when executed, cause the one or more processors to perform operations for controlling charging of an electronic device, the operations comprising:
   estimating a usage time value that corresponds to an estimated time at which the user will next attempt to use the electronic device;
   estimating a resume time value that corresponds to a time for charging to commence to allow for completion of charging from a first predetermined state of charge value to a second predetermined state of charge value by the usage time value;
   charging a battery of the electronic device using electrical power supplied by a charging device until a current state of charge of the battery reaches the first predetermined state of charge value;
   entering, by the electronic device, a deactivated mode after the current state of charge reaches the first predetermined state of charge value; and
   causing the electronic device to return to an activated mode according to the resume time value.

10. The non-transitory computer-readable storage device of claim 9, wherein causing the electronic device to return to the activated mode according to the resume time value includes transmitting a wake signal from the charging device to the electronic device after a current time value reaches the resume time value, wherein the electronic device is configured to enter the activated mode in response to receiving the wake signal.

11. The non-transitory computer-readable storage device of claim 9, further comprising:
   subsequent to returning to the activated mode, charging the battery of the electronic device using electrical power supplied by the charging device until the current state of charge of the battery reaches the second predetermined state of charge value.

12. The non-transitory computer-readable storage device of claim 9, wherein the charging device is a charging case and the electronic device is located in the charging case when the electronic device is electrically connected to the charging device.

13. The non-transitory computer-readable storage device of claim 9, wherein estimating the usage time value is performed based on charging history information for the electronic device.

14. The non-transitory computer-readable storage device of claim 9, wherein estimating the usage time value is performed based on connection history information regarding wireless communications between the electronic device and a host device.

15. The non-transitory computer-readable storage device of claim 9, wherein estimating the usage time value is performed by a controller of the electronic device.

16. The non-transitory computer-readable storage device of claim 9, wherein estimating the usage time value is performed by a controller of the charging device.

17. A system for controlling charging of an electronic device, comprising:
   one or more processors that are provided with computer program instructions that, when executed by the one or more processors, cause the one or more processors to:
      estimate a usage time value that corresponds to an estimated time at which the user will next attempt to use the electronic device,
      estimate a resume time value that corresponds to a time for charging to commence to allow for completion of charging from a first predetermined state of charge value to a second predetermined state of charge value by the usage time value,
      charge a battery of the electronic device using electrical power supplied by a charging device until a current state of charge of the battery reaches the first predetermined state of charge value,
      enter, by the electronic device, a deactivated mode after the current state of charge reaches the first predetermined state of charge value, and
      cause the electronic device to return to an activated mode according to the resume time value.

18. The system of claim 17, wherein the computer program instructions to cause the electronic device to return to the activated mode according to the resume time value include instructions to transmit a wake signal from the charging device to the electronic device after a current time value reaches the resume time value, wherein the electronic device is configured to enter the activated mode in response to receiving the wake signal.

19. The system of claim 17, wherein the computer program instructions, when executed by the one or more processors, further cause the one or more processors to:
   subsequent to returning to the activated mode, charge the battery of the electronic device using electrical power supplied by the charging device until the current state of charge of the battery reaches the second predetermined state of charge value.

20. The system of claim 17, wherein the charging device is a charging case and the electronic device is located in the charging case when the electronic device is electrically connected to the charging device.

21. The system of claim 17, wherein the usage time value is estimated based on charging history information for the electronic device.

22. The system of claim 17, wherein the usage time value is estimated based on connection history information regarding wireless communications between the electronic device and a host device.

23. The system of claim 17, wherein the usage time value is estimated by a controller of the electronic device.

24. The system of claim 17, wherein the usage time value is estimated by a controller of the charging device.

* * * * *